US012650912B2

(12) United States Patent
Dar et al.

(10) Patent No.: US 12,650,912 B2
(45) Date of Patent: Jun. 9, 2026

(54) SYSTEM AND METHOD FOR MACHINE LEARNING-BASED TEMPERATURE FORECASTING FOR STORAGE OBJECTS USING STORAGE SUB-OBJECTS AND TEMPERATURE PROJECTION

(71) Applicant: Dell Products L.P., Round Rock, TX (US)

(72) Inventors: Shaul Dar, Petach Tikva (IL); Ramakanth Kanagovi, Bengaluru (IN); Guhesh Swaminathan, Tamil Nadu (IN); Rajan Kumar, Nawada (IN); Shuyu Lee, Acton, MA (US); Vamsi Vankamamidi, Hopkinton, MA (US)

(73) Assignee: Dell Products L.P., Round Rock, TX (US)

( * ) Notice: Subject to any disclaimer, the term of this patent is extended or adjusted under 35 U.S.C. 154(b) by 673 days.

(21) Appl. No.: 18/159,967

(22) Filed: Jan. 26, 2023

(65) Prior Publication Data

US 2024/0256414 A1     Aug. 1, 2024

(51) Int. Cl.
*G06F 11/30* (2006.01)
(52) U.S. Cl.
CPC ...... *G06F 11/3058* (2013.01); *G06F 11/3034* (2013.01)

(58) Field of Classification Search
CPC ...... G06F 11/3058; G06F 11/30; G06F 11/00; G06F 11/3034; G06F 11/3003
See application file for complete search history.

(56) References Cited

U.S. PATENT DOCUMENTS

| | | | | | |
|---|---|---|---|---|---|
| 2019/0220217 A1* | 7/2019 | Kimmel | ................ | G06F 3/0649 |
| 2021/0132830 A1* | 5/2021 | Dalmatov | ............. | G06F 16/172 |
| 2023/0036528 A1* | 2/2023 | Vankamamidi | ......... | G06F 3/067 |
| 2023/0051781 A1* | 2/2023 | Patel | ..................... | G06F 3/0611 |

* cited by examiner

*Primary Examiner* — Mohamed Charioui
(74) *Attorney, Agent, or Firm* — Brian J. Colandreo; Heath M. Sargeant; Holland & Knight LLP

(57) ABSTRACT

A method, computer program product, and computing system for forecasting a temperature of a storage object of a storage system using a machine learning model. The storage object may be divided into a plurality of storage sub-objects. A temperature may be determined for each storage sub-object using a simple moving average. A portion of the temperature of the storage object may be projected onto the temperature of each of the plurality of storage sub-objects based upon, at least in part, the temperature determined for each storage sub-object and the temperature determined for each storage object.

20 Claims, 6 Drawing Sheets

10

SYSTEM AND METHOD FOR MACHINE LEARNING-BASED TEMPERATURE FORECASTING FOR STORAGE OBJECTS USING STORAGE SUB-OBJECTS AND TEMPERATURE PROJECTION

BACKGROUND

Storing and safeguarding electronic content may be beneficial in modern business and elsewhere. Accordingly, various methodologies may be employed to protect and distribute such electronic content.

The ability to forecast the future activity of objects such as files, volumes, or extents, in a storage system, can enable significant performance gains. For example, it can enable better tiering and caching in a storage system, assist in load balancing across a storage cluster, or help guide data placement and movement in a cloud or combined on-premises and cloud environment. The level of activity is often referred to as the "temperature" of the storage object, where an active object is considered "hot" and an inactive object is considered "cold". The temperature may be defined in terms of the number of IO operations performed by the storage object in a given time unit, the total number of bytes transferred, or some combination of similar metrics.

While a machine-learning (ML)-based approach can forecast the future temperature of storage objects with far greater accuracy (i.e., smaller error) than simple statistical methods, in a storage system comprising millions of objects, the cost of generating features, building a model (i.e., training), and using it periodically to forecast the temperature of all storage objects (i.e., inference), can be prohibitive, in terms of the memory footprint and CPU overhead.

SUMMARY OF DISCLOSURE

In one example implementation, a computer-implemented method executed on a computing device may include, but is not limited to, forecasting a temperature of a storage object of a storage system using a machine learning model. The storage object may be divided into a plurality of storage sub-objects. A temperature may be determined for each storage sub-object using a simple moving average. A portion of the temperature of the storage object may be projected onto the temperature of each of the plurality of storage sub-objects based upon, at least in part, the temperature determined for each storage sub-object and the temperature determined for each storage object.

One or more of the following example features may be included. Forecasting the temperature for each storage object may include: processing a plurality of input/output (IO) requests associated with the storage object; and generating a plurality of IO features using the plurality of IO requests. Generating the plurality of IO features using the plurality of IO requests may include: aggregating the plurality of IO requests periodically; and generating the plurality of IO features using the aggregated plurality of IO requests. Forecasting the temperature of the storage object may include processing the plurality of IO features using the machine learning model. Determining the temperature for each storage sub-object may include determining the temperature for each storage sub-object with a single IO feature of the plurality of IO features. Dividing the storage object into a plurality of storage sub-objects may include adaptively dividing the storage object based upon, at least in part, performance of the storage system. Projecting the portion of the temperature of the storage object may include determining a ratio of the temperature of each storage sub-object relative to other sub-objects of the storage object.

In another example implementation, a computer program product resides on a computer readable medium that has a plurality of instructions stored on it. When executed by a processor, the instructions cause the processor to perform operations that may include, but are not limited to, forecasting a temperature of a storage object of a storage system using a machine learning model. The storage object may be divided into a plurality of storage sub-objects. A temperature may be determined for each storage sub-object using a simple moving average. A portion of the temperature of the storage object may be projected onto the temperature of each of the plurality of storage sub-objects based upon, at least in part, the temperature determined for each storage sub-object and the temperature determined for each storage object.

One or more of the following example features may be included. Forecasting the temperature for each storage object may include: processing a plurality of input/output (IO) requests associated with the storage object; and generating a plurality of IO features using the plurality of IO requests. Generating the plurality of IO features using the plurality of IO requests may include: aggregating the plurality of IO requests periodically; and generating the plurality of IO features using the aggregated plurality of IO requests. Forecasting the temperature of the storage object may include processing the plurality of IO features using the machine learning model. Determining the temperature for each storage sub-object may include determining the temperature for each storage sub-object with a single IO feature of the plurality of IO features. Dividing the storage object into a plurality of storage sub-objects may include adaptively dividing the storage object based upon, at least in part, performance of the storage system. Projecting the portion of the temperature of the storage object may include determining a ratio of the temperature of each storage sub-object relative to other storage sub-objects of the storage object.

In another example implementation, a computing system includes at least one processor and at least one memory architecture coupled with the at least one processor, wherein the at least one processor is configured to forecast a temperature of a storage object of a storage system using a machine learning model. The storage object may be divided into a plurality of storage sub-objects. A temperature may be determined for each storage sub-object using a simple moving average. A portion of the temperature of the storage object may be projected onto the temperature of each of the plurality of storage sub-objects based upon, at least in part, the temperature determined for each storage sub-object and the temperature determined for each storage object.

One or more of the following example features may be included. Forecasting the temperature for each storage object may include: processing a plurality of input/output (IO) requests associated with the storage object; and generating a plurality of IO features using the plurality of IO requests. Generating the plurality of IO features using the plurality of IO requests may include: aggregating the plurality of IO requests periodically; and generating the plurality of IO features using the aggregated plurality of IO requests. Forecasting the temperature of the storage object may include processing the plurality of IO features using the machine learning model. Determining the temperature for each storage sub-object may include determining the temperature for each storage sub-object with a single IO feature of the plurality of IO features. Dividing the storage object into a plurality of storage sub-objects may include adaptively dividing the storage object based upon, at least in part, performance of the storage system. Projecting the portion of the temperature of the storage object may include determining a ratio of the temperature of each storage sub-object relative to other storage sub-objects of the storage object.

The details of one or more example implementations are set forth in the accompanying drawings and the description below. Other possible example features and/or possible example advantages will become apparent from the description, the drawings, and the claims. Some implementations may not have those possible example features and/or possible example advantages, and such possible example features and/or possible example advantages may not necessarily be required of some implementations.

BRIEF DESCRIPTION OF THE DRAWINGS

Like reference symbols in the various drawings indicate like elements.

DETAILED DESCRIPTION

Figure 1:
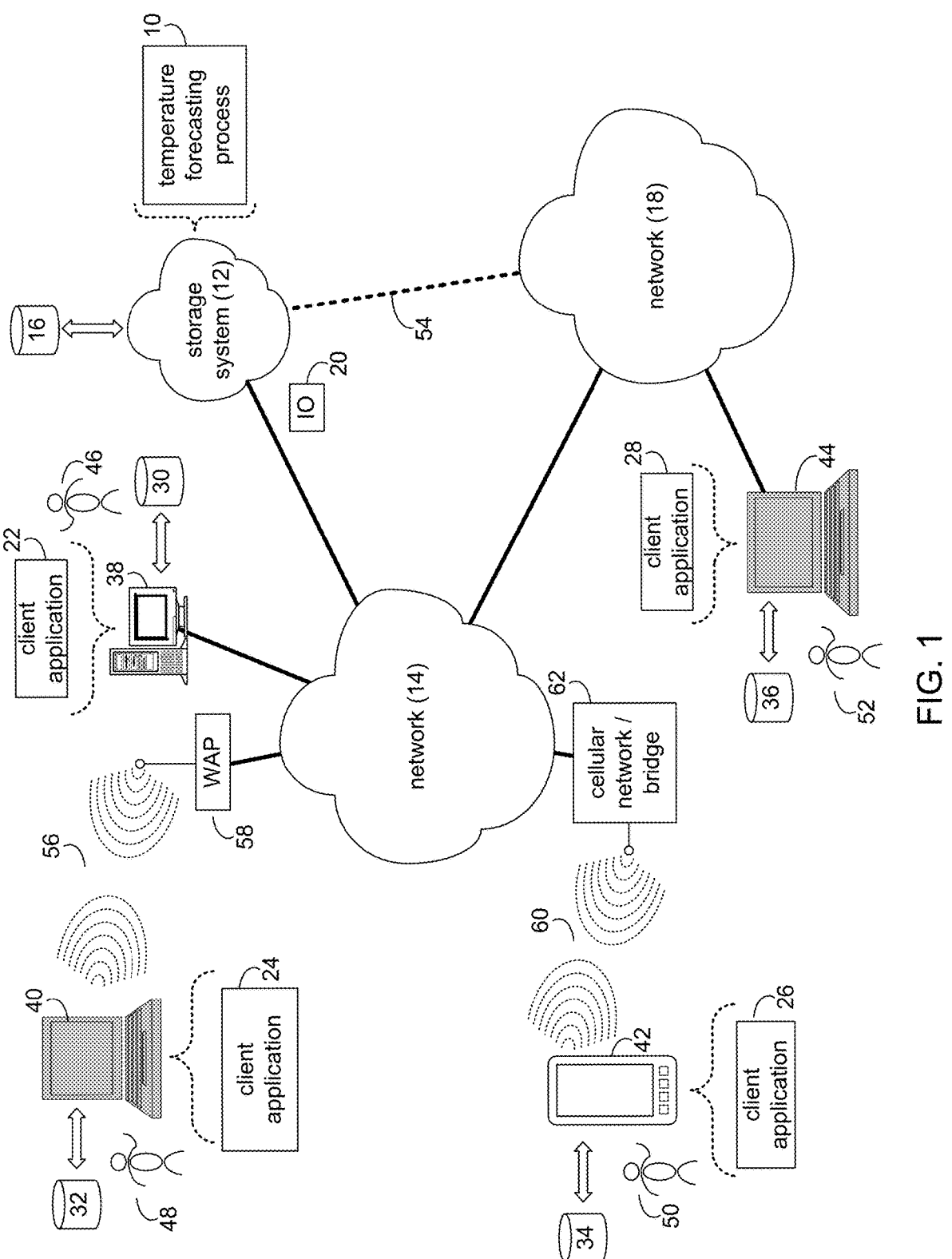
FIG. 1 is an example diagrammatic view of a storage system and a temperature forecasting process coupled to a distributed computing network according to one or more example implementations of the disclosure.

System Overview:

Referring to FIG. 1, there is shown temperature forecasting process 10 that may reside on and may be executed by storage system 12, which may be connected to network 14 (e.g., the Internet or a local area network). Examples of storage system 12 may include, but are not limited to: a Network Attached Storage (NAS) system, a Storage Area Network (SAN), a personal computer with a memory system, a server computer with a memory system, and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

The instruction sets and subroutines of temperature forecasting process 10, which may be stored on storage device 16 included within storage system 12, may be executed by one or more processors (not shown) and one or more memory architectures (not shown) included within storage system 12. Storage device 16 may include but is not limited to: a hard disk drive; a tape drive; an optical drive; a RAID device; a random access memory (RAM); a read-only memory (ROM); and all forms of flash memory storage devices. Additionally/alternatively, some portions of the instruction sets and subroutines of temperature forecasting process 10 may be stored on storage devices (and/or executed by processors and memory architectures) that are external to storage system 12.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (e.g., a request that content be written to storage system 12) and data read requests (e.g., a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; tape drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (e.g., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft® Windows®; Mac® OS X®; Red Hat® Linux®, Windows® Mobile, Chrome OS, Blackberry OS, Fire OS, or a custom operating system. (Microsoft and Windows are registered trademarks of Microsoft Corporation in the United States, other countries or both; Mac and OS X are registered trademarks of Apple Inc. in the United States, other countries or both; Red Hat is a registered trademark of Red Hat Corporation in the United States, other countries or both; and Linux is a registered trademark of Linus Torvalds in the United States, other countries or both).

In some implementations, as will be discussed below in greater detail, a temperature forecasting process, such as temperature forecasting process 10 of FIG. 1, may include but is not limited to, forecasting a temperature of a storage object of a storage system using a machine learning model. The storage object may be divided into a plurality of storage sub-objects. A temperature may be determined for each storage sub-object using a simple moving average. A portion of the temperature of the storage object may be projected onto each of the plurality of storage sub-objects based upon, at least in part, the temperature determined for each storage sub-object and the temperature determined for each storage object.

For example purposes only, storage system 12 will be described as being a network-based storage system that includes a plurality of electro-mechanical backend storage devices. However, this is for example purposes only and is not intended to be a limitation of this disclosure, as other configurations are possible and are considered to be within the scope of this disclosure.

Figure 2:
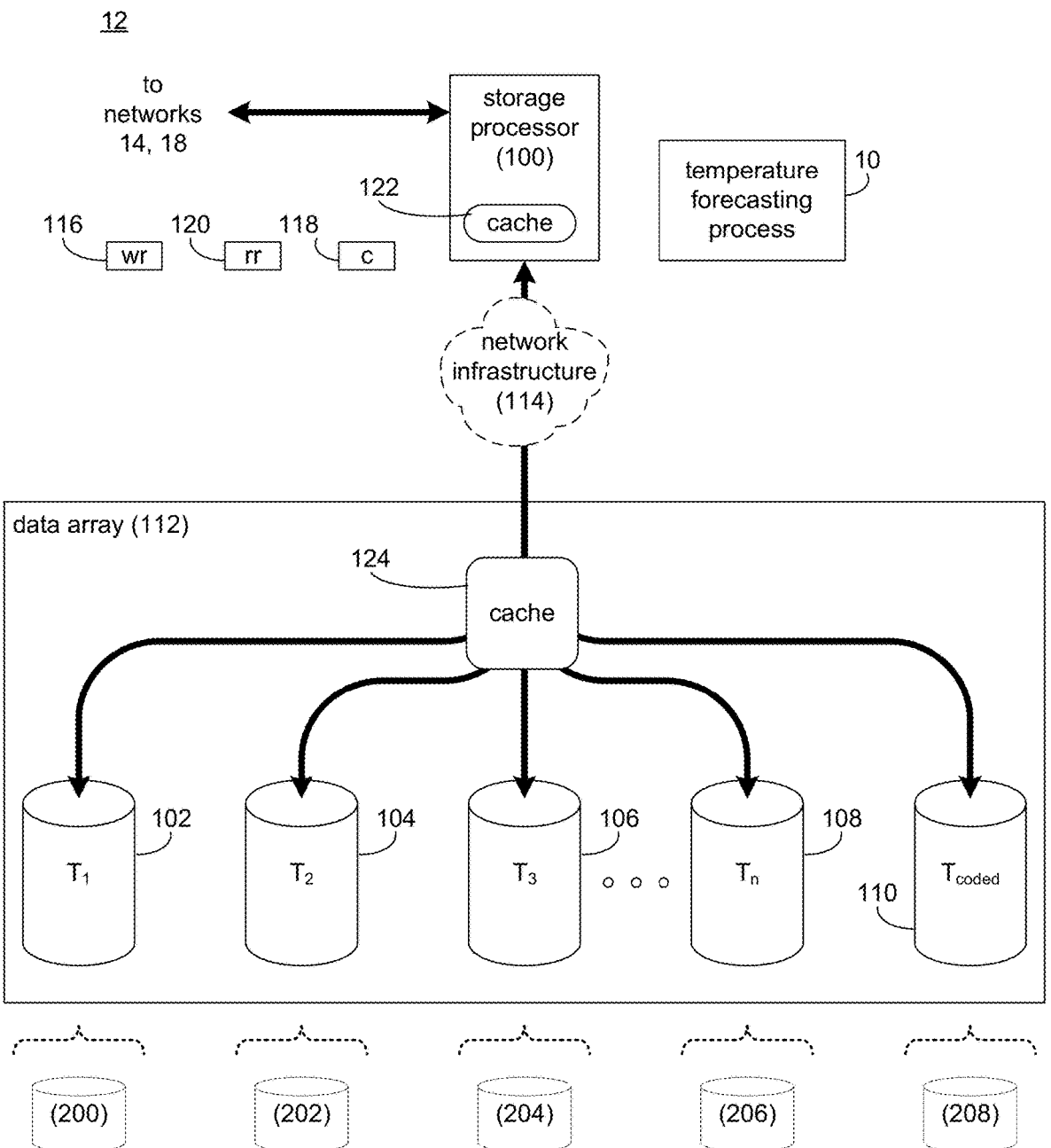
FIG. 2 is an example diagrammatic view of the storage system of FIG. 1 according to one or more example implementations of the disclosure.
Figure 3:
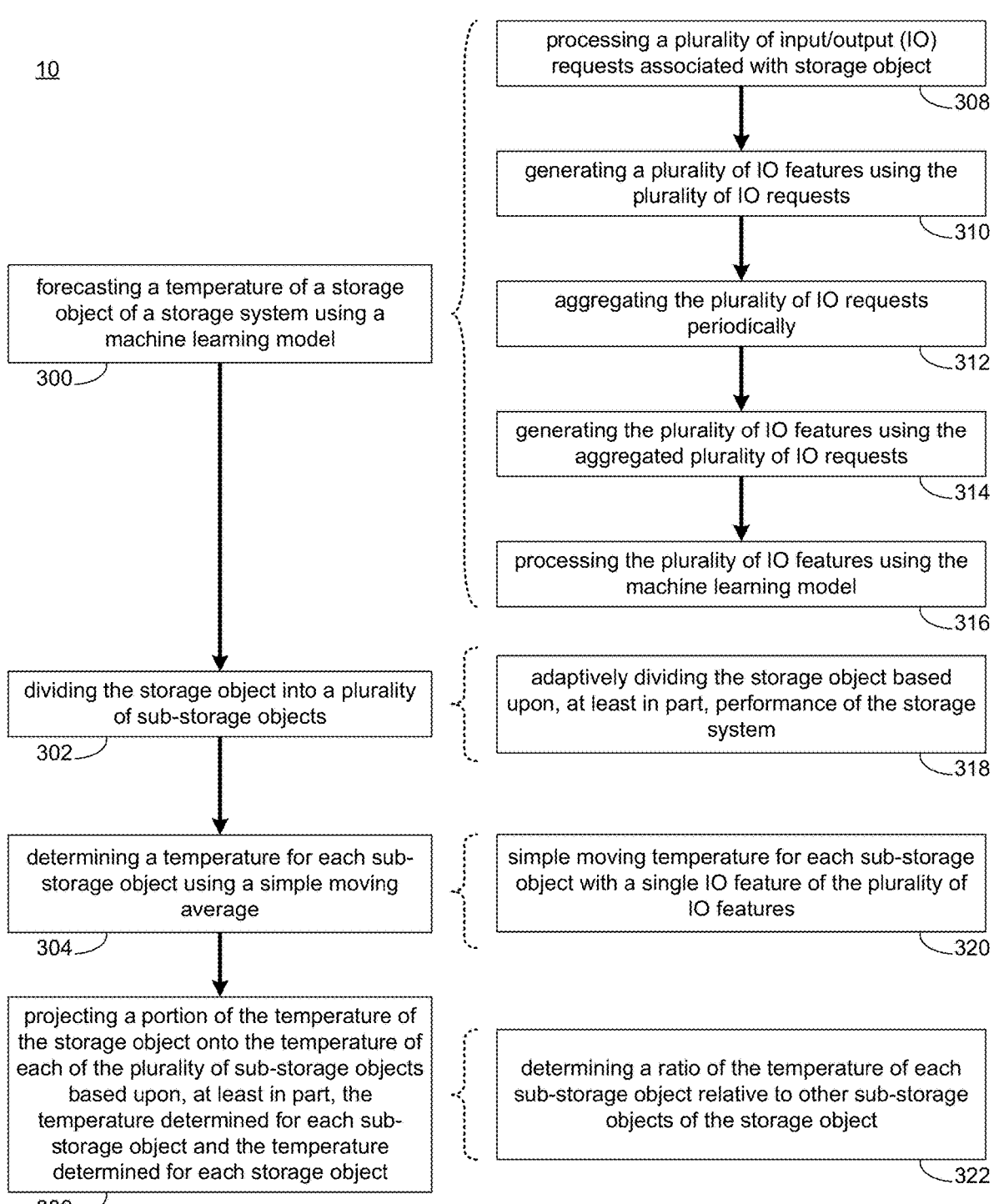
FIG. 3 is an example flowchart of temperature forecasting process according to one or more example implementations of the disclosure.

The Storage System:

Referring also to FIG. 2, storage system 12 may include storage processor 100 and a plurality of storage targets T 1-n (e.g., storage targets 102, 104, 106, 108). Storage targets 102, 104, 106, 108 may be configured to provide various levels of performance and/or high availability. For example, one or more of storage targets 102, 104, 106, 108 may be configured as a RAID 0 array, in which data is striped across storage targets. By striping data across a plurality of storage targets, improved performance may be realized. However, RAID 0 arrays do not provide a level of high availability. Accordingly, one or more of storage targets 102, 104, 106, 108 may be configured as a RAID 1 array, in which data is mirrored between storage targets. By mirroring data between storage targets, a level of high availability is achieved as multiple copies of the data are stored within storage system 12.

While storage targets 102, 104, 106, 108 are discussed above as being configured in a RAID 0 or RAID 1 array, this is for example purposes only and is not intended to be a limitation of this disclosure, as other configurations are possible. For example, storage targets 102, 104, 106, 108 may be configured as a RAID 3, RAID 4, RAID 5 or RAID 6 array.

While in this particular example, storage system 12 is shown to include four storage targets (e.g. storage targets 102, 104, 106, 108), this is for example purposes only and is not intended to be a limitation of this disclosure. Specifically, the actual number of storage targets may be increased or decreased depending upon e.g., the level of redundancy/performance/capacity required.

Storage system 12 may also include one or more coded targets 110. As is known in the art, a coded target may be used to store coded data that may allow for the regeneration of data lost/corrupted on one or more of storage targets 102, 104, 106, 108. An example of such a coded target may include but is not limited to a hard disk drive that is used to store parity data within a RAID array.

While in this particular example, storage system 12 is shown to include one coded target (e.g., coded target 110), this is for example purposes only and is not intended to be a limitation of this disclosure. Specifically, the actual number of coded targets may be increased or decreased depending upon e.g. the level of redundancy/performance/capacity required.

Examples of storage targets 102, 104, 106, 108 and coded target 110 may include one or more electro-mechanical hard disk drives and/or solid-state/flash devices, wherein a combination of storage targets 102, 104, 106, 108 and coded target 110 and processing/control systems (not shown) may form data array 112.

The manner in which storage system 12 is implemented may vary depending upon e.g. the level of redundancy/performance/capacity required. For example, storage system 12 may be a RAID device in which storage processor 100 is a RAID controller card and storage targets 102, 104, 106, 108 and/or coded target 110 are individual "hot-swappable" hard disk drives. Another example of such a RAID device may include but is not limited to an NAS device. Alternatively, storage system 12 may be configured as a SAN, in which storage processor 100 may be e.g., a server computer and each of storage targets 102, 104, 106, 108 and/or coded target 110 may be a RAID device and/or computer-based hard disk drives. Further still, one or more of storage targets 102, 104, 106, 108 and/or coded target 110 may be a SAN.

In the event that storage system 12 is configured as a SAN, the various components of storage system 12 (e.g. storage processor 100, storage targets 102, 104, 106, 108, and coded target 110) may be coupled using network infrastructure 114, examples of which may include but are not limited to an Ethernet (e.g., Layer 2 or Layer 3) network, a fiber channel network, an InfiniBand network, or any other circuit switched/packet switched network.

Storage system 12 may execute all or a portion of temperature forecasting process 10. The instruction sets and subroutines of temperature forecasting process 10, which may be stored on a storage device (e.g., storage device 16) coupled to storage processor 100, may be executed by one or more processors (not shown) and one or more memory architectures (not shown) included within storage processor 100. Storage device 16 may include but is not limited to: a hard disk drive; a tape drive; an optical drive; a RAID device; a random access memory (RAM); a read-only memory (ROM); and all forms of flash memory storage devices. As discussed above, some portions of the instruction sets and subroutines of temperature forecasting process 10 may be stored on storage devices (and/or executed by processors and memory architectures) that are external to storage system 12.

As discussed above, various IO requests (e.g. IO request 20) may be generated. For example, these IO requests may be sent from client applications 22, 24, 26, 28 to storage system 12. Additionally/alternatively and when storage processor 100 is configured as an application server, these IO requests may be internally generated within storage processor 100. Examples of IO request 20 may include but are not limited to data write request 116 (e.g., a request that content 118 be written to storage system 12) and data read request 120 (i.e. a request that content 118 be read from storage system 12).

During operation of storage processor 100, content 118 to be written to storage system 12 may be processed by storage processor 100. Additionally/alternatively and when storage processor 100 is configured as an application server, content 118 to be written to storage system 12 may be internally generated by storage processor 100.

Storage processor 100 may include frontend cache memory system 122. Examples of frontend cache memory system 122 may include but are not limited to a volatile, solid-state, cache memory system (e.g., a dynamic RAM cache memory system) and/or a non-volatile, solid-state, cache memory system (e.g., a flash-based, cache memory system).

Storage processor 100 may initially store content 118 within frontend cache memory system 122. Depending upon the manner in which frontend cache memory system 122 is configured, storage processor 100 may immediately write content 118 to data array 112 (if frontend cache memory system 122 is configured as a write-through cache) or may subsequently write content 118 to data array 112 (if frontend cache memory system 122 is configured as a write-back cache).

Data array 112 may include backend cache memory system 124. Examples of backend cache memory system 124 may include but are not limited to a volatile, solid-state, cache memory system (e.g., a dynamic RAM cache memory system) and/or a non-volatile, solid-state, cache memory system (e.g., a flash-based, cache memory system). During operation of data array 112, content 118 to be written to data array 112 may be received from storage processor 100. Data array 112 may initially store content 118 within backend cache memory system 124 prior to being stored on e.g. one or more of storage targets 102, 104, 106, 108, and coded target 110.

As discussed above, the instruction sets and subroutines of temperature forecasting process 10, which may be stored on storage device 16 included within storage system 12, may be executed by one or more processors (not shown) and one or more memory architectures (not shown) included within storage system 12. Accordingly, in addition to being executed on storage processor 100, some or all of the instruction sets and subroutines of temperature forecasting process 10 may be executed by one or more processors (not shown) and one or more memory architectures (not shown) included within data array 112.

Further and as discussed above, during the operation of data array 112, content (e.g., content 118) to be written to data array 112 may be received from storage processor 100 and initially stored within backend cache memory system 124 prior to being stored on e.g. one or more of storage targets 102, 104, 106, 108, 110. Accordingly, during use of data array 112, backend cache memory system 124 may be populated (e.g., warmed) and, therefore, subsequent read requests may be satisfied by backend cache memory system 124 (e.g., if the content requested in the read request is present within backend cache memory system 124), thus avoiding the need to obtain the content from storage targets 102, 104, 106, 108, 110 (which would typically be slower). The Temperature Forecasting Process:

Referring also to the examples of FIGS. 3-6 and in some implementations, temperature forecasting process 10 may forecast 300 a temperature of a storage object of a storage system using a machine learning model. The storage object may be divided 302 into a plurality of storage sub-objects. A temperature may be determined 304 for each storage sub-object using a simple moving average. A portion of the temperature of the storage object may be projected 306 onto the temperature of each of the plurality of storage sub-objects based upon, at least in part, the temperature for each storage sub-object and the temperature determined for each storage object.

As will be discussed in greater detail below, implementations of the present disclosure may allow for greater accuracy and higher resolution in forecasting temperature by projecting temperature forecast for larger storage objects using a full machine learning model to smaller or storage sub-objects using less computationally-intensive processing (e.g., a temperature determined for each storage sub-object using a simple moving average). For example, the ability to forecast the future activity of objects such as files, volumes, or extents, in a storage system, can enable significant performance gains. This can enable better tiering and caching in a storage system, assist in load balancing across a storage cluster, or help guide data placement and movement in a cloud or combined on-premises and cloud environment. The level of activity is often referred to as the "temperature" of the storage object, where an active object is considered "hot" and an inactive object is considered "cold". The temperature may be defined in terms of the number of IO operations performed by the storage object in a given time unit, the total number of bytes transferred, or some combination of similar metrics.

While a machine-learning (ML)-based approach can forecast the future temperature of storage objects with far greater accuracy (i.e., smaller error) than simple statistical methods, in a storage system comprising millions of objects, the cost of generating features, building a model (i.e., training), and using it periodically to forecast the temperature of all storage objects (i.e., inference), can be prohibitive, in terms of the memory footprint and CPU overhead. Accordingly, implementations of the present disclosure allow for the machine learning model-approach for forecasting temperature to be applied to larger storage objects and then projected to smaller or storage sub-objects using less expensive (in terms of memory and CPU resources) processing of IO features.

In some implementations, temperature forecasting process 10 may forecast 300 a temperature of a storage object of a storage system using a machine learning model. Forecasting a temperature of a storage object includes generating a temperature value indicative of a likelihood that a storage object will be accessed within a particular time frame. The temperature may incorporate the number of IO requests performed against the storage object, as well as the number of bytes transferred, within the relevant time frame. For example, the temperature value may include a read temperature, a write temperature, and/or a combination of a read and write temperature. That is, a temperature value may indicate a likelihood that data may be read from a storage object and/or that data may be written to a storage object within a particular time frame. In some implementations, the temperature value may be utilized by various tiering policies to optimize the tiering of the storage objects within the storage system. For example, the temperature prediction may enable various tiering policies that use the predicted temperature, along with other values such as the system parameters (e.g., the tiering hierarchy topology, sizes of various layers, etc.), to optimize (up or down) tiering decisions, resulting in a performance gain.

In some implementations, forecasting 300 the temperature for each storage object includes: processing 308 a plurality of input/output (IO) requests associated with the storage object; and generating 310 a plurality of IO features using the plurality of IO requests. For example and referring again to FIG. 2, during the operation of a storage system (e.g., storage system 12), IO operations may be generated for processing data on various storage objects (e.g., storage objects 200, 202, 204, 206, 208). Storage objects (e.g., storage objects 200, 202, 204, 206, 208) may generally include any container or storage unit configured to store data within a storage system (e.g., storage system 12). For example, a storage object may be any one of the following: a volume (aka Logical Unit Number (LUN)), a file, or parts thereof that may be defined e.g. by offsets or address ranges (e.g., sub-LUNs, disk extents, and/or slices). In some implementations, the plurality of storage objects include a block storage object and/or a file storage object. A block storage object is a block or chunk of storage that can be accessed by various operating systems. In some implementations, a file storage object is a folder or subset of a hierarchical data structure accessible by a particular path within the hierarchical data structure.

Figure 4:
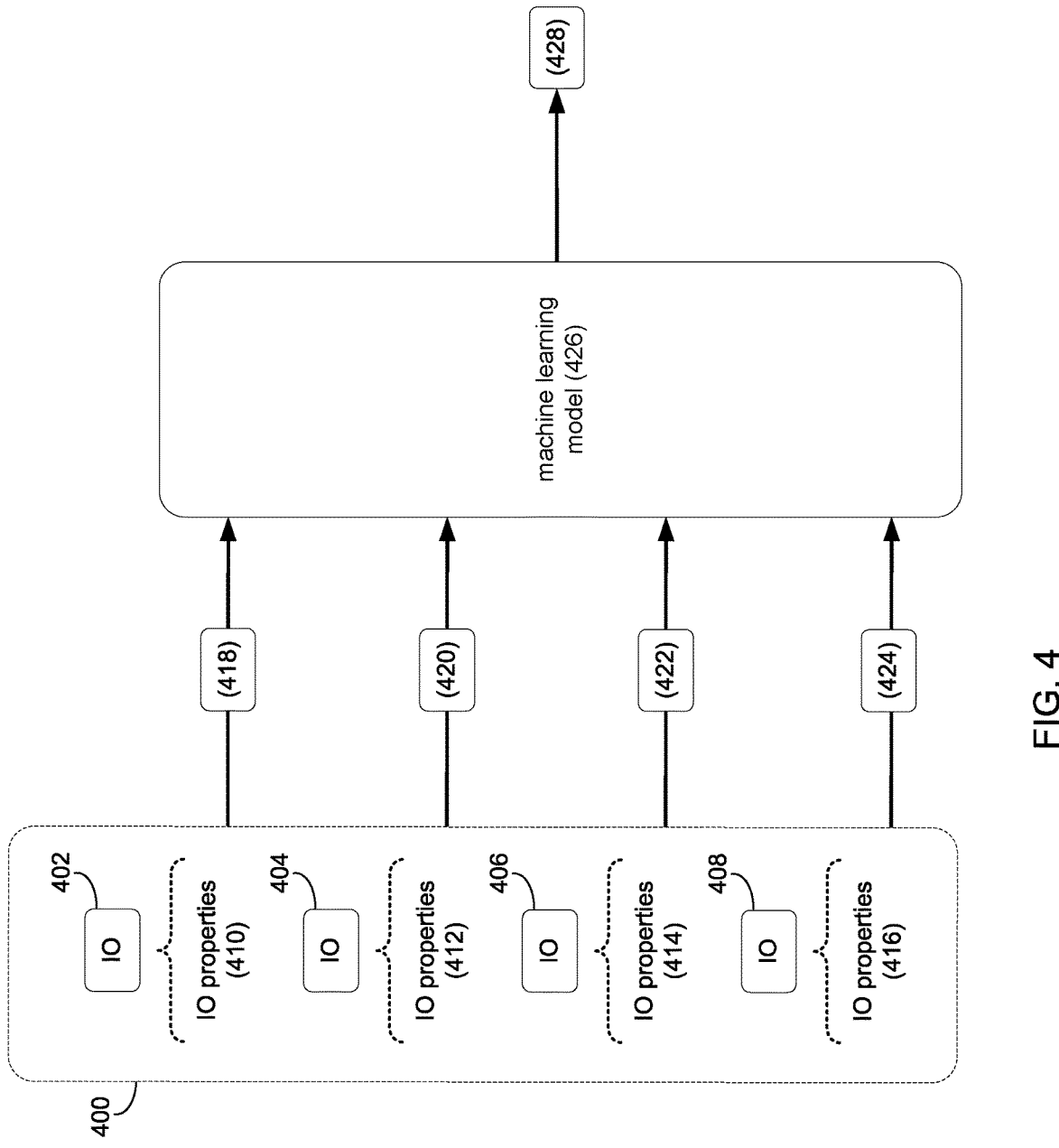
FIGS. 4-5 are example diagrammatic views of the temperature forecasting process according to various example implementations of the disclosure.

Referring also to FIG. 4, a plurality of IO requests (e.g., plurality of IO requests 400) may include e.g., four IO requests associated with various storage objects and/or the same storage object. IO request 402 may include a request to perform a read IO operation on a first storage object (e.g., storage object 200); IO request 404 may include a request to perform a write IO operation on storage object 200; IO request 406 may include a request to perform a read IO operation on storage object 200; and IO request 408 may include a request to perform an operation on storage object 200. While four separate IO requests for a single storage object have been described, it will be appreciated that this is for example purposes only and that any number of IO requests may be received for any number of storage objects within the present disclosure.

In some implementations, temperature forecasting process 10 generates 310 a plurality of IO features using the plurality of IO requests. An IO feature is a representation of a plurality of IO properties associated with a particular storage object over a period of time. Examples of IO features include a number of IO requests per second (IOPS); a total number of read IO requests; a total number of write IO requests; a percentage of sequential read IO requests; a percentage of sequential write IO requests; an average length of read IO requests; an average length of write IO requests; a standard deviation in read IO request length; a standard deviation in write IO request length; an average arrival rate of any IO request; an average arrival rate for read IO requests; an average arrival rate for write IO requests; an average difference in logical block address (LBA) between IO requests; an average difference in LBA between consecutive read IO requests; an average difference in logical block address (LBA) between consecutive write IO requests; etc.

In some implementations, temperature forecasting process 10 generates 310 the plurality of IO features by extracting salient data elements (e.g., one or more IO properties) such as volume ID, timestamp, IO command type (e.g. read, write, unmap, etc.), logical block address (LBA) (i.e., an offset in the data path's thin address space), length, pattern (e.g., sequential, random, caterpillar, IO-stride), etc. from the plurality of IO requests. In this manner, temperature forecasting process 10 may extract various IO properties associated with the plurality of IO requests. Referring again to FIG. 4 and in some implementations, temperature forecasting process 10 may extract one or more IO properties from plurality of IO requests 400. For example, temperature forecasting process 10 may extract IO properties 410 from IO request 402; IO properties 412 from IO request 404; IO properties 414 from IO request 406; and IO properties 416 from IO request 408.

In some implementations, generating 310 the plurality of IO features using the plurality of IO requests includes aggregating 312 the plurality of IO requests periodically, and generating 314 the plurality of IO features using the aggregated plurality of IO requests. For example, temperature forecasting process 10 may aggregate the one or more IO properties periodically to optimize for memory/storage requirements and/or CPU costs. Additionally, temperature forecasting process 10 may use a sampling approach where IO properties for every "n" th IO request are extracted. In some implementations, the number of IO requests between extracting the one or more IO properties may be user-defined, a default number of IO requests, and/or defined automatically by temperature forecasting process 10. In this manner, temperature forecasting process 10 may limit the amount of processing of IO requests to generate IO features by sampling and aggregating 312 a limited set of all of the IO requests received at the storage system. Referring again to FIG. 4 and in some implementations, temperature forecasting process 10 may aggregate 314 IO properties 410 from IO request 402; IO properties 412 from IO request 404; IO properties 414 from IO request 406; and IO properties 416 from IO request 408 and generate 310 a plurality of IO features (e.g., IO features 418, 420, 422, 424).

In some implementations, temperature forecasting process 10 processes the plurality of IO features using a machine learning model. A machine learning model may generally include an algorithm or combination of algorithms that has been trained to recognize certain types of patterns. For example, machine learning approaches may be generally divided into three categories, depending on the nature of the signal available: supervised learning, unsupervised learning, and reinforcement learning. Supervised learning may include presenting a computing device with example inputs and their desired outputs, given by a "teacher", where the goal is to learn a general rule that maps inputs to outputs. With unsupervised learning, no labels are given to the learning algorithm, leaving it on its own to find structure in its input. Unsupervised learning can be a goal in itself (discovering hidden patterns in data) or a means towards an end (feature learning). Reinforcement learning may generally include a computing device interacting in a dynamic environment in which it must perform a certain goal (such as driving a vehicle or playing a game against an opponent). As it navigates its problem space, the machine learning model is provided feedback that is analogous to rewards, which it tries to maximize. While three examples of machine learning approaches have been provided, it will be appreciated that other machine learning approaches are possible within the scope of the present disclosure. In one example, a random-forest machine learning model may be used due to its generality, simplicity, tunability, and ability to cope with over-fitting. However, it will be appreciated that various machine learning models may be used within the scope of the present disclosure to process 304 the plurality of IO features. Referring again to FIG. 4 and in some implementations, temperature forecasting process 10 may process 316 the plurality of IO features (e.g., IO features 418, 420, 422, 424) using a machine learning model (e.g., machine learning model 426).

In some implementations, temperature forecasting process 10 may process 316, using the machine learning model, the plurality of IO features (e.g., IO features 418, 420, 422, 424) to define a temperature value (e.g., temperature 428) for one or more storage objects of the storage system. For example, the machine learning model may forecast or predict a temperature value of each storage extent, which may be correlated with storage system performance gain if a tiering operation to a particular tier (e.g., up-tiering/promotion to highest tier or down-tiering/demotion to lowest tier) is applied to that storage extent. In this manner, the temperature value may be an indication of a temperature associated with the storage object. For example, if a storage object is accessed more frequently, IO requests for that storage object will be most efficiently processed using a higher performance storage tier. By contrast, if a storage object is accessed infrequently, IO requests for that storage object may be efficiently processed using a lower performance storage tier.

In some implementations, the machine learning model may be used for regression. For example, ensemble methods such as Random Forrest (a collection of decision trees) may be candidates for these machine learning models because of their simplicity, speed, and lower risk of overfitting. However, it will be appreciated that the one or more machine learning models may utilize various types of machine learning algorithms for processing the one or more IO features to define a temperature value for one or more storage objects of the storage system within the scope of the present disclosure.

In some implementations, the one or more machine learning models may be configured for one or more of: offline training and continuous training. Offline training may generally include a one-time or single training of the one or more machine learning models with training data that is performed separately from the processing of non-training data. Continuous training may generally include changing or updating the one or more machine learning models data comes in, e.g. with every "n"th IO request. Temperature forecasting process 10 may also guide the training process to acquire more useful data using active learning. For example, temperature forecasting process 10 can sample with higher frequency the storage objects in which the quality of the current is low.

Figure 5:
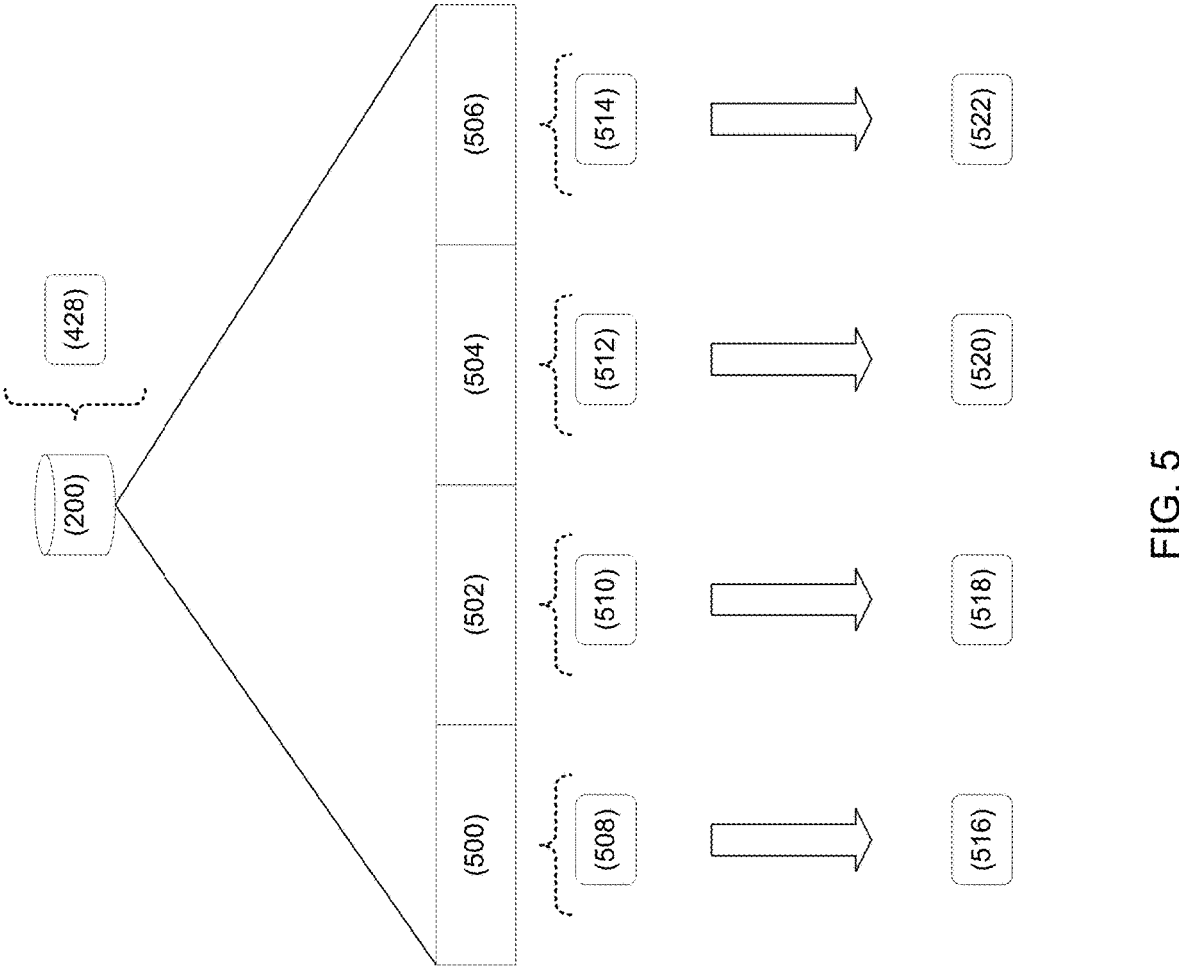

In some implementations, temperature forecasting process 10 may divide 302 the storage object into a plurality of storage sub-objects. A storage sub-object is a portion of the storage object. For example, a storage sub-object may be a fixed portion (e.g., in terms of size or percentage of the storage object) or dynamically defined portion. In some implementations, the size and/or amount of storage sub-objects for a storage object may be user-defined (e.g., via a user interface), a default value (e.g., one quarter of the total amount of memory in the storage object), and/or a dynamically-defined (e.g., as will be described in greater below). In one example, suppose that the storage object is a 32 megabyte slice. In this example, temperature forecasting process 10 may divide 302 the storage object into e.g., four storage sub-objects (e.g., eight megabyte slices). Referring also to FIG. 5, suppose temperature forecasting process 10 forecasts 300 a temperature (e.g., temperature 428) for storage object (e.g., storage object 200). In this example, temperature forecasting process 10 divides 302 storage object 200 (e.g., a 32 megabyte slice) into a plurality of storage sub-objects (e.g., storage sub-objects 500, 502, 504, 506) of equal size (e.g., eight megabytes).

In some implementations, dividing 302 the storage object into a plurality of storage sub-objects may include adaptively dividing 318 the storage object based upon, at least in part, performance of the storage system. For example, in the above example, 32 megabyte slices are divided into four eight megabyte sub-slices. However, temperature forecasting process 10 can adapt the slice sizes and the ratio between slices and sub-slices according to the system state, IO pressure, and available memory. When more resources are available, temperature forecasting process 10 detects highly dynamic IO patterns, and/or when the feedback about the accuracy (e.g., comparing the forecasted temperatures to the actual temperatures measured for each storage slice) suggests a high level of error, temperature forecasting process 10 can use smaller slices and sub-slices, getting better accuracy and "fidelity" at the cost of higher RAM and CPU footprint. By contrast, with fewer resources and stable IO patterns, and/or when the forecasting accuracy is above a threshold (e.g., a predefined threshold), temperature forecasting process 10 can use larger slices and sub-slices, and thus reduce the pressure on the storage system.

In some implementations, temperature forecasting process 10 may determine 304 a temperature for each storage sub-object using a simple moving average. For example and as discussed above, when forecasting 300 temperature 428 for storage object 200, temperature forecasting process 10 uses a plurality of IO features (e.g., over 30 features) for each time interval considered. However, for larger storage objects, the temperature forecast may not account for inter-storage object activity. Suppose storage object 200 includes four eight megabyte portions with three inactive portions and one active portion. In this example, temperature 428 for storage object 200 may result in low performance tiering for storage object 200 because 75% of storage object 200 is considered inactive. If the temperature was forecast for each storage sub-object, temperature forecasting process 10 may more effectively tier each storage sub-object. However, processing each storage sub-object using machine learning model 426 requires significant computational resources compared to processing each storage object (e.g., 32 megabyte granularity versus eight megabyte granularity). Accordingly and in some implementations, temperature forecasting process 10 may use a computationally less expensive (in terms of storage system resources) method for determining a more granular temperature representation for each storage sub-object. However, this less expensive approach is also less accurate than the machine learning model approach described above. As will be discussed in greater detail below, temperature forecasting process 10 may project a portion of the temperature of the storage object onto each storage sub-object based upon, at least in part, the granular temperature representation determined for each storage sub-object.

In some implementations, temperature forecasting process 10 may determine a temperature for each storage sub-object using a simple moving average. A temperature is a value indicative of a likelihood that data may be read from a storage sub-object and/or that data may be written to a storage sub-object within a particular time frame. Simple moving average (SMA) is an arithmetic moving average calculated by adding recent values and then dividing that figure by the number of time periods in the calculation average. Referring again to FIG. 5, temperature forecasting process 10 may determine 304 a temperature for each storage sub-object using a simple moving average (e.g., temperature 508 for storage sub-object 500; temperature 510 for storage sub-object 502; temperature 512 for storage sub-object 504; and temperature 514 for storage sub-object 506).

In some implementations, determining 304 the temperature for each storage sub-object may include determining 320 the temperature for each storage sub-object with a single IO feature of the plurality of IO features. For example, when determining 320 the temperature for storage sub-objects, temperature forecasting process 10 may use a historical temperature variable (e.g., read bandwidth for the previous time intervals) which is used to forecast the future temperature. In this example, temperature forecasting process 10 determines 320 the temperature with a single IO feature (e.g., read bandwidth for a previous time interval). In this manner, the temperature for each storage object represents the respective temperature contribution to the storage object without requiring the computing resources of the machine learning model.

In some implementations, temperature forecasting process 10 may project 306 a portion of the temperature of the storage object onto the temperature of each of the plurality of storage sub-objects based upon, at least in part, the temperature determined for each storage sub-object and the temperature determined for each storage object. For example, projecting 306 a portion of the temperature of the storage object onto the temperature of each storage sub-object includes allocating a portion of the temperature value forecast 300 for the storage object to the temperature of each storage sub-object.

In some implementations, projecting 306 the portion of the temperature of the storage object may include determining 322 a ratio of the temperature of each storage sub-object relative to other storage sub-objects of the storage object. For example, suppose that temperature forecasting process 10 determines a temperature value of e.g., 0.75 for storage object 200 using machine learning model 200 and the plurality of IO features discussed above. Further suppose that temperature forecasting process 10 determines 304 a temperature of e.g., 0.1 for storage sub-object 500; 0.1 for storage sub-object 502; 0.3 for storage sub-object 504; and 0.5 for storage sub-object 506. Temperature forecasting process 10 may project 306 the temperature value for storage object 200 (e.g., temperature value 428) onto the temperature of each of storage sub-objects 500, 502, 504, 506. In this example, temperature forecasting process 10 may determine a ratio of the temperature for each storage sub-object relative to all of the storage sub-objects of the storage object. In this example, temperature forecasting process 10 may project 306 0.1*0.75 onto storage sub-object 500 (e.g., 0.1/(0.1+0.1+0.3+0.5)=0.1/1=0.1*temperature of storage object 200) (e.g., represented in FIG. 5 as projected temperature 516); 0.1*0.75 onto storage sub-object 502 (e.g., 0.1/(0.1+0.1+0.3+0.5)=0.1/1=0.1*temperature of storage object 200) (e.g., represented in FIG. 5 as projected temperature 518); 0.3*0.75 onto storage sub-object 504 (e.g., 0.3/(0.1+0.1+0.3+0.5)=0.3/1=0.3*temperature of storage object 200) (e.g., represented in FIG. 5 as projected temperature 520); and 0.5*0.75 onto storage sub-object 506 (e.g., 0.5/(0.1+0.1+0.3+0.5)=0.5/1=0.5*temperature of storage object 200) (e.g., represented in FIG. 5 as projected temperature 522). Accordingly, temperature forecasting process 10 may allocate the temperature value forecast 300 using machine learning model 426 onto each storage sub-object using the ratio or contribution of each storage sub-object to the total temperature of the storage object.

In some implementations, temperature forecasting process 10 may tier the one or more storage objects between a plurality of storage tiers of the storage system, based upon, at least in part, the temperature values defined for each storage sub-object. Tiering may generally include the movement or relocation of data from one storage tier to another storage tier based upon, at least in part, the frequency of data usage or the expected frequency of data usage. For example and as discussed above, different storage tiers may be designed for various performance levels. Using the specific example of SSDs, once data is identified as frequently used, the identified blocks of data may be moved in the background to the SSD rather than being copied, since the SSD is being utilized as a primary storage tier, not a look aside copy area. When the data is subsequently accessed, the IO requests directed to the data may occur at or near the native performance of the SSDs.

Figure 6:
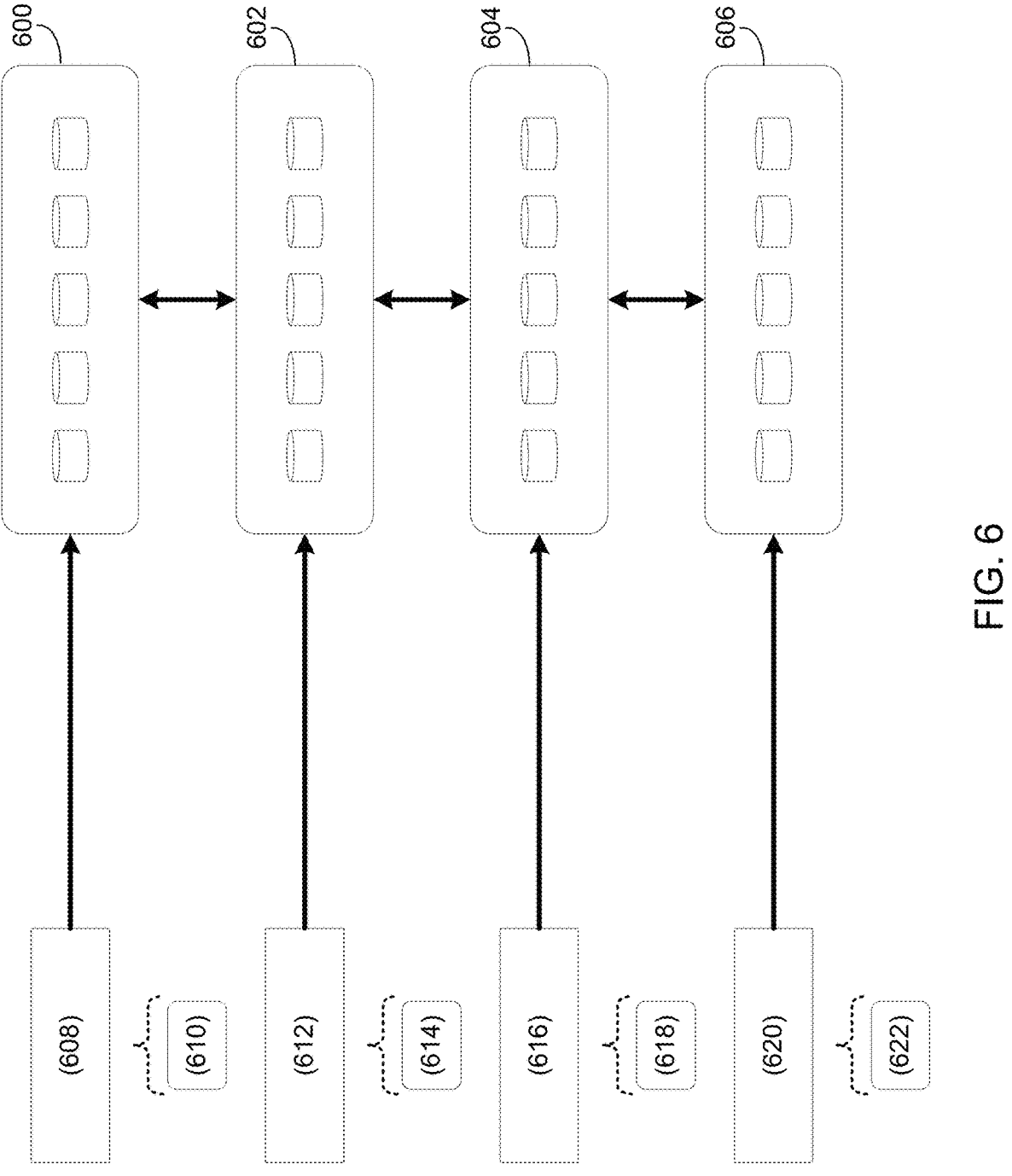
FIG. 6 is an example diagrammatic view of the tiering of storage sub-objects according to one or more example implementations of the disclosure.

Referring also to FIG. 6 and in some implementations, suppose storage system 12 includes or has access to e.g., four different storage tiers (e.g., storage tiers 600, 602, 604, 606) with four different performance levels. For example, storage tier 600 may be associated with a high level performance storage tier (e.g., NVRAM); storage tier 602 may be associated with a mid-level performance storage tier (e.g., SSD); storage tier 604 may be associated with a low level performance storage tier (e.g., HDD); and storage tier 606 may be associated with an off premise, low level performance storage tier (e.g., cloud storage).

For example, storage tier 606 may include cloud storage tiering. Temperature forecasting process 10 may provide data movement between on premise storage tiers (e.g., storage tiers 600, 602, 604) and private or public cloud storage (e.g., storage tier 606), and data movement between multiple cloud storage service types, by treating the cloud storage services as additional storage tiers with known retrieval times, transfer and storage costs, much like local media such as tape archives. Accordingly, temperature forecasting process 10 may provide for tiering between any number of or type of storage tiers within the scope of the present disclosure.

As each storage sub-object may be accessed at various times and frequencies throughout the life cycle of the storage object, temperature forecasting process 10 may tier or re-tier the storage sub-object in various storage tiers corresponding to the degree that the storage sub-object is accessed or predicted to be accessed. Accordingly, temperature forecasting process 10 may define a temperature value indicative of the likelihood that a storage sub-object will be accessed within a particular time frame.

In some implementations, tiering each storage sub-objects between a plurality of storage tiers of the storage system, based upon, at least in part, the temperature values defined for each storage sub-object of the storage system may and one or more tiering policies include defining a plurality of tiering thresholds for the plurality of storage tiers based upon, at least in part, the temperature values defined for each storage sub-objects. As discussed above, various temperature values may be defined for the storage sub-objects. Temperature forecasting process 10 may utilize the temperature values to determine which storage tier of a plurality of storage tiers to tier the storage sub-objects to. For example, temperature forecasting process 10 may define a plurality of tiering thresholds for the plurality of storage tiers using the temperature values for the storage sub-objects. As will be discussed in greater below, the plurality of tiering thresholds may indicate which storage tier to tier storage sub-objects within.

A tiering policy may generally include a rule or portion of logic that determines how a storage object is tiered within a storage system. Tiering policies may be user-defined and/or automatically define by temperature forecasting process 10. As discussed above, tiering policies may utilize the temperature value defined by the one or more machine learning models along with other system parameters (e.g., the tiering hierarchy topology, sizes of various layers, etc.), to optimize tiering decisions. For example, tiering policies may define when to promote or up-tier particular storage objects to a higher performance storage tier based upon, the temperature value defined for the storage objects and performance characteristics of the storage system. Similarly, tiering policies may define when to demote or down-tier particular storage sub-objects to a lower performance storage tier based upon, the temperature value defined for the storage sub-objects and performance characteristics of the storage system. In this manner, temperature forecasting process 10 may optimize the tiering of storage objects by enabling particular tiering policies for specific storage objects using the temperature values defined for the storage objects.

In some implementations, temperature forecasting process 10 may define a plurality of tiering thresholds based upon, at least in part, the temperature values for each storage sub-object. For example, temperature forecasting process 10 may define a first tiering threshold for "cold" storage sub-objects; a second tiering threshold for "warm" storage sub-objects; and a third tiering threshold for "hot" storage sub-objects. While an example of three tiering thresholds has been described (e.g., "cold", "warm", and "hot" thresholds), it will be appreciated that temperature forecasting process 10 may define any number of tiering thresholds within the scope of the present disclosure.

Temperature forecasting process 10 may define the number of and/or values of the plurality of tiering thresholds in terms of temperature values based upon, at least in part, a defined capacity for each storage tier, the performance capability of each storage tier, the number of storage tiers, and/or data efficiency operations associated with storage of data on a particular storage tier (e.g., data compression, data deduplication, etc. associated with each storage tier). The tiering threshold for each storage tier may be defined with an initial threshold, a default threshold, a user-defined threshold (e.g., input via a user interface), and/or may be an automatically defined threshold (e.g., generated by temperature forecasting process 10).

Referring also to FIG. 6 and in some implementations, suppose temperature forecasting process 10 defines a high temperature value for storage sub-object 608. Suppose temperature forecasting process 10 defines three tiering thresholds. In this example, suppose that the first tiering threshold defines the threshold (e.g., a temperature value of at least 0.95) for tiering storage sub-objects in a high level performance storage tier (e.g., storage tier 600); the second tiering threshold defines the threshold (e.g., a temperature value of at least 0.5) for tiering storage sub-objects in a mid-level performance storage tier (e.g., storage tier 602); and the third tiering threshold defines the threshold (e.g., a temperature value of greater than 0) for tiering storage sub-objects in a low level performance storage tier (e.g., storage tier 604). Accordingly, temperature forecasting process 10 may tier storage sub-object 608 into storage tier 600 based upon, at least in part, temperature value 610 defined for storage sub-object 608 (e.g., as temperature value 610 is greater than a first tiering threshold, a second tiering threshold, and a third tiering threshold).

Further suppose that temperature forecasting process 10 defines a moderate temperature value for storage sub-object 612 (e.g., temperature value 614). In this example, temperature forecasting process 10 may tier storage sub-object 612 into storage tier 602 based upon, at least in part, temperature value 614 defined for storage sub-object 612 (e.g., as temperature value 614 is greater than a first tiering threshold and a second tiering threshold but is less than a third tiering threshold).

In another example, suppose that temperature forecasting process 10 defines a low temperature value for storage sub-object 616. In this example, temperature forecasting process 10 may tier storage sub-object 616 into storage tier 604 based upon, at least in part, temperature value 618 defined for storage sub-object 616 (e.g., as temperature value 618 is greater than the first tiering threshold but is less than second tiering threshold and the third tiering threshold).

Suppose that temperature forecasting process 10 defines, using machine learning model 426, a minimum temperature value for storage sub-object 620 because storage sub-object 620 is unlikely to be accessed in the near future, if at all. In this example, temperature forecasting process 10 may tier storage sub-object 620 into storage tier 606 based upon, at least in part, temperature value 622 defined for storage sub-object 620. In this example, temperature forecasting process 10 may utilize an additional tiering threshold to determine when to tier storage objects to storage tier 606.

In some implementations, tiering the storage sub-objects between a plurality of storage tiers of the storage system, based upon, at least in part, the temperature values defined for the storage sub-objects of the storage system may include dynamically adjusting the plurality of tiering thresholds for the plurality of storage tiers based upon, at least in part, performance of the plurality of storage tiers. For example, temperature forecasting process 10 may dynamically and continuously adjust the plurality of tiering thresholds using a feedback-loop to maximize one or more goal functions (e.g. minimize access time, etc.). The plurality of tiering thresholds may dynamically adjust for changes in storage system performance; storage system configurations (e.g., number and types of storage tiers); and/or the sizing/capacity of the storage tiers (i.e., an amount of NVRAM, SSD and HDD capacity in the storage system). In this manner, temperature forecasting process 10 may dynamically adjust the plurality of tiering thresholds for the plurality of storage tiers by monitoring the performance of the plurality of storage tiers.

Referring also to Table 1 below, in some implementations, the hit ratio (e.g., percentage of requests served from cache or top tier) measured for read bandwidth, write bandwidth, read IO operations, and total IO operations is shown with the projected latency that pushes the hottest storage sub-objects to the top tier while leaving the others in the bottom tier:

TABLE 1

| | Hit Ratio % - Read_BW | Hit Ratio % - Total_BW | Hit Ratio % - Read_IO | Hit Ratio % - Total_IO | Projected Latency (milliseconds) |
|---|---|---|---|---|---|
| Ideal, 32 MB slices | 99.54% | 87.19% | 89.95% | 72.12% | 0.07 ms |
| Weighted Regression, 32 MB slices | 85.91% | 79.67% | 69.67% | 56.69% | 0.20 ms |
| Weighted Regression, 32 MB Slices, 8 MB sub-slices | 90.96% | 86.17% | 77.81% | 64.23% | 0.15 ms |
| Weighted Regression, 8 MB slices | 98.03% | 93.46% | 85.43% | 76.61% | 0.09 ms |
| SMA, 8 MB slices | 45.60% | 42.04% | 53.78% | 47.14% | 0.57 ms |

As shown above, the machine learning model performance with 32 megabyte slices and eight megabyte sub-slices is far better than when using only 32 megabyte slices without sub-slices. As expected, the results for the weighted regression with eight megabyte sub-slices are lower than those when using eight megabyte slices, however these results are achieved at a fraction of the cost as shown below in Table 2:

TABLE 2

|  | Memory - Training | CPU times - Training | CPU times - Testing | Wall times - Training | Wall times - Testing |
| --- | --- | --- | --- | --- | --- |
| 32 MB Slices | 3.8 GB | 1.25 sec | 64.2 ms | 13 min 59 s | 6.45 sec. |
| 32 MB Slices, 8 MB Sub-Slices | 4.1 GB | 1.25 sec | 67.7 ms | 13 min 59 s | 7.10 sec. |
| 8 MB Slices | 7.1 GB | 2.71 sec | 107.8 ms | 27 min 50 s | 13.32 sec. |

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to implementations of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various implementations of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular implementations only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various implementations with various modifications as are suited to the particular use contemplated.

A number of implementations have been described. Having thus described the disclosure of the present application in detail and by reference to implementations thereof, it will be apparent that modifications and variations are possible without departing from the scope of the disclosure defined in the appended claims.

What is claimed is:

1. A computer-implemented method, executed on a computing device, comprising:
    forecasting a temperature of a storage object of a storage system using a machine learning model;
    dividing the storage object into a plurality of storage sub-objects;
    determining a temperature for each storage sub-object using a simple moving average; and
    projecting a portion of the temperature of the storage object onto the temperature of each of the plurality of storage sub-objects based upon, at least in part, the temperature determined for each storage sub-object and the temperature determined for each storage object.

2. The computer-implemented method of claim 1, wherein forecasting the temperature for each storage object includes:
    processing a plurality of input/output (IO) requests associated with the storage object; and
    generating a plurality of IO features using the plurality of IO requests.

3. The computer-implemented method of claim 2, wherein generating the plurality of IO features using the plurality of IO requests includes:

aggregating the plurality of IO requests periodically; and
    generating the plurality of IO features using the aggregated plurality of IO requests.

4. The computer-implemented method of claim 2, wherein forecasting the temperature of the storage object includes processing the plurality of IO features using the machine learning model.

5. The computer-implemented method of claim 2, wherein determining the temperature for each storage sub-object includes determining the temperature for each storage sub-object with a single IO feature of the plurality of IO features.

6. The computer-implemented method of claim 1, wherein dividing the storage object into a plurality of storage sub-objects includes adaptively dividing the storage object based upon, at least in part, performance of the storage system.

7. The computer-implemented method of claim 1, wherein projecting the portion of the temperature of the storage object includes determining a ratio of the temperature of each storage sub-object relative to other storage sub-objects of the storage object.

8. A computer program product residing on a non-transitory computer readable medium having a plurality of instructions stored thereon which, when executed by a processor, cause the processor to perform operations comprising:
    forecasting a temperature of a storage object of a storage system using a machine learning model;
    dividing the storage object into a plurality of storage sub-objects;
    determining a temperature for each storage sub-object using a simple moving average; and
    projecting a portion of the temperature of the storage object onto the temperature for each of the plurality of storage sub-objects based upon, at least in part, the temperature determined for each storage sub-object and the temperature determined for each storage object.

9. The computer program product of claim 8, wherein forecasting the temperature for each storage object includes:
    processing a plurality of input/output (IO) requests associated with the storage object; and
    generating a plurality of IO features using the plurality of IO requests.

10. The computer program product of claim 9, wherein generating the plurality of IO features using the plurality of IO requests includes:
    aggregating the plurality of IO requests periodically; and
    generating the plurality of IO features using the aggregated plurality of IO requests.

11. The computer program product of claim 9, wherein forecasting the temperature of the storage object includes processing the plurality of IO features using the machine learning model.

12. The computer program product of claim 9, wherein determining the temperature for each storage sub-object includes determining the temperature for each storage sub-object with a single IO feature of the plurality of IO features.

13. The computer program product of claim 8, wherein dividing the storage object into a plurality of storage sub-objects includes adaptively dividing the storage object based upon, at least in part, performance of the storage system.

14. The computer program product of claim 8, wherein projecting the portion of the temperature of the storage object includes determining a ratio of the temperature of each storage sub-object relative to other storage sub-objects of the storage object.

15. A computing system comprising:

a memory; and a processor configured to forecast a temperature of a storage object of a storage system using a machine learning model, wherein the processor is further configured to divide the storage object into a plurality of storage sub-objects, wherein the processor is further configured to determine a temperature for each storage sub-object using a simple moving average, and wherein the processor is further configured to project a portion of the temperature of the storage object onto the temperature of each of the plurality of storage sub-objects based upon, at least in part, the temperature determined for each storage sub-object and the temperature determined for each storage object.

16. The computing system of claim 15, wherein forecasting the temperature for each storage object includes:

processing a plurality of input/output (IO) requests associated with the storage object; and generating a plurality of IO features using the plurality of IO requests.

17. The computing system of claim 16, wherein generating the plurality of IO features using the plurality of IO requests includes:

aggregating the plurality of IO requests periodically; and generating the plurality of IO features using the aggregated plurality of IO requests.

18. The computing system of claim 16, wherein forecasting the temperature of the storage object includes processing the plurality of IO features using the machine learning model.

19. The computing system of claim 16, wherein determining the temperature for each storage sub-object includes determining the temperature for each storage sub-object with a single IO feature of the plurality of IO features.

20. The computing system of claim 15, wherein dividing the storage object into a plurality of storage sub-objects includes adaptively dividing the storage object based upon, at least in part, performance of the storage system.

* * * * *